INVENTORS
FRANCO PRANDI
GIANPIERO PRANDI
BY
McGlew & Toren
ATTORNEYS

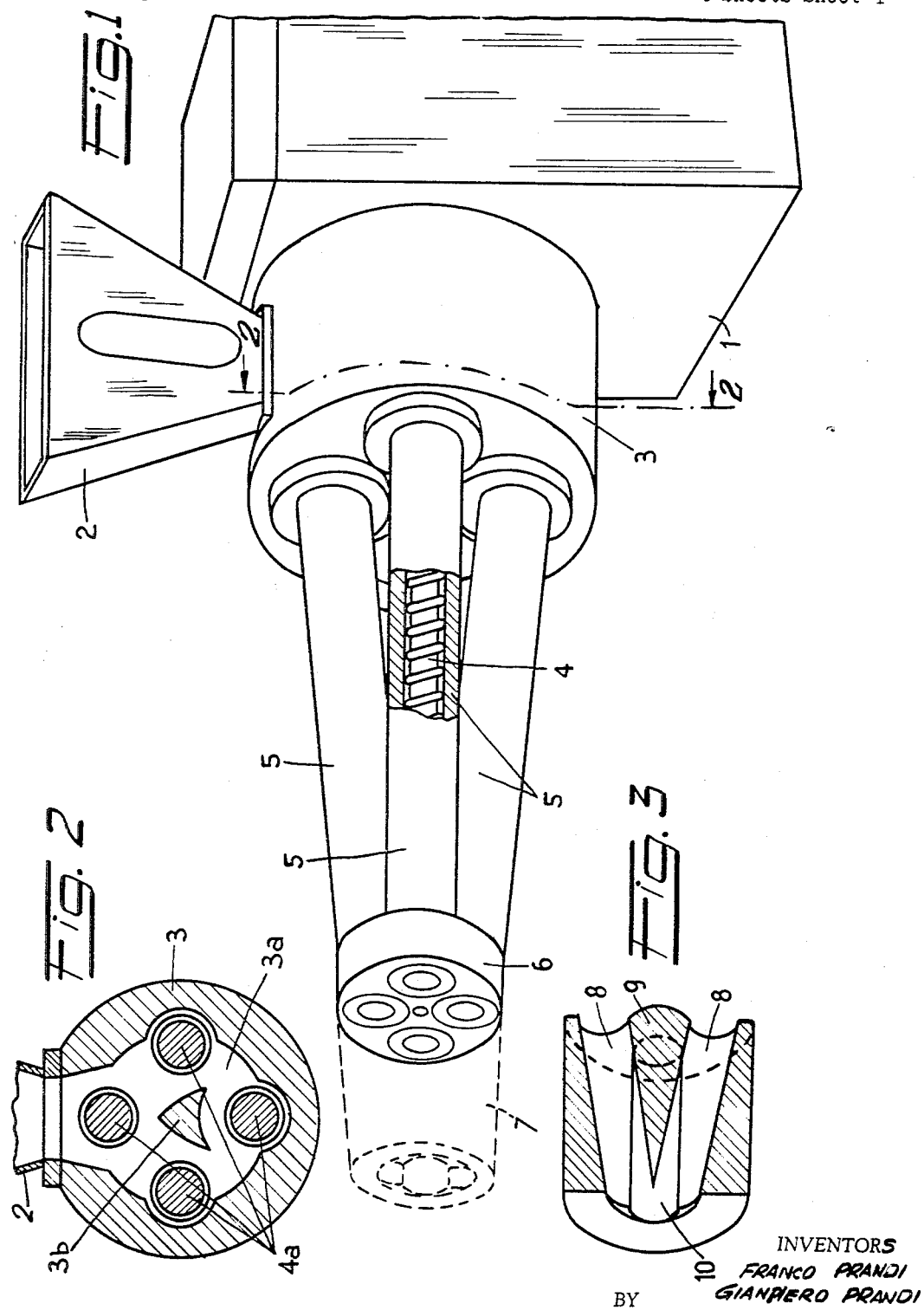

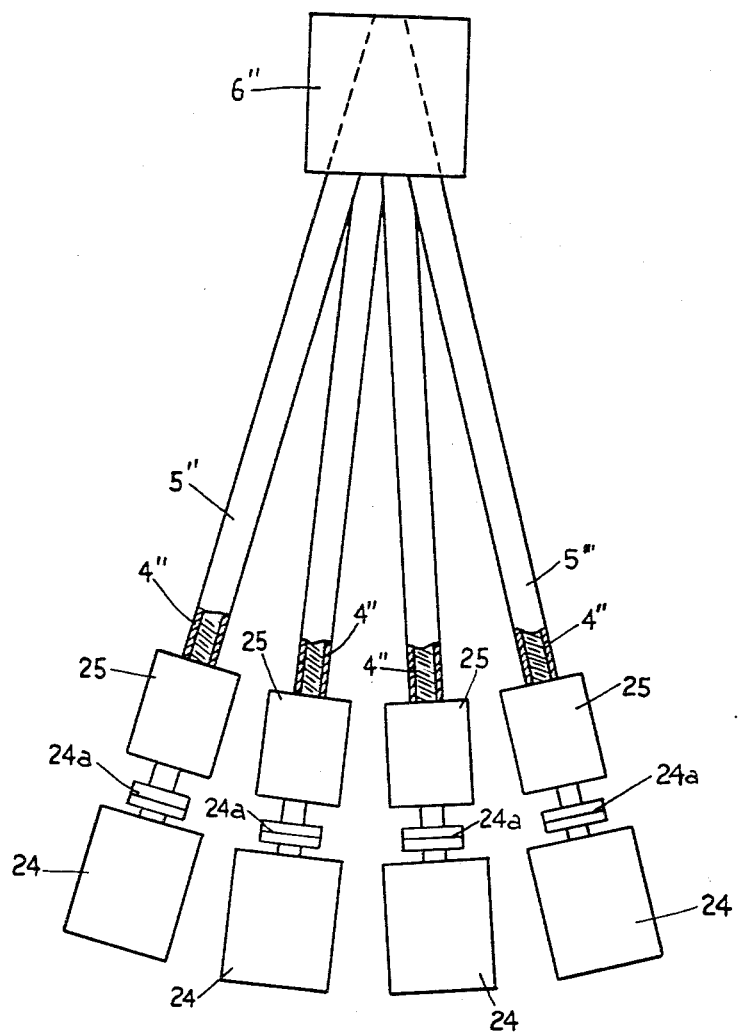

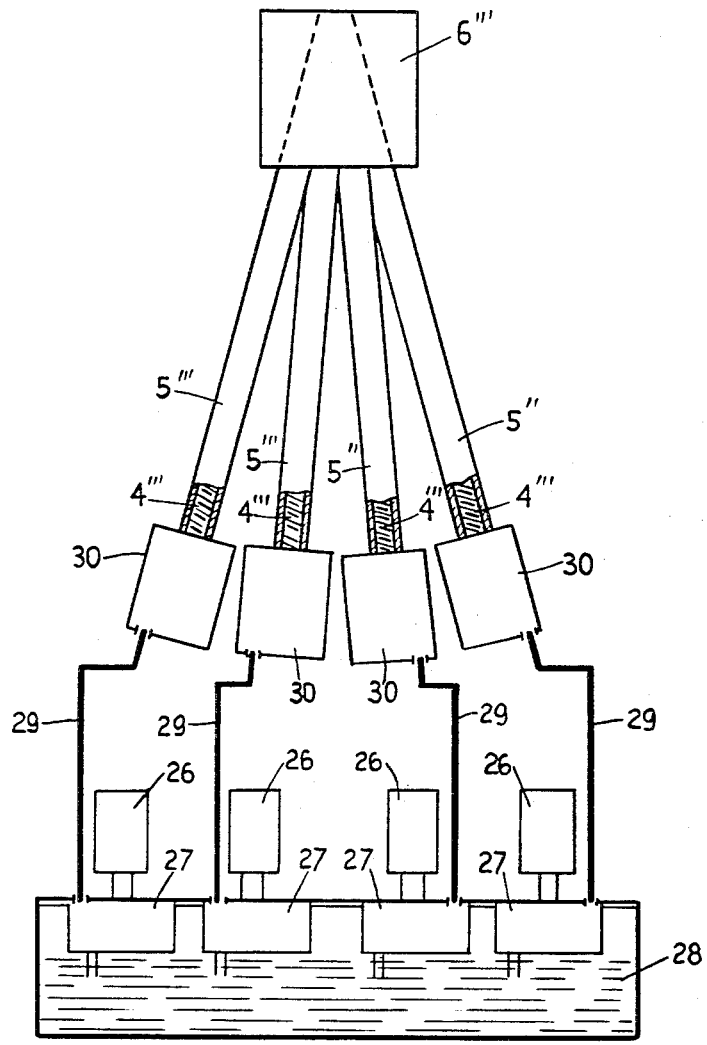

3,413,684
Patented Dec. 3, 1968

3,413,684
EXTRUSION MACHINE WITH
VARIABLE DISCHARGE
Franco Prandi and Gianpiero Prandi, both of
Via Tevere 3, Oleggio, Novara, Italy
Filed Sept. 8, 1966, Ser. No. 577,858
Claims priority, application Italy, Sept. 30, 1965, 9,594/65;
Dec. 6, 1965, 11,972/65; Jan. 29, 1966, 13,949/66
3 Claims. (Cl. 18—12)

ABSTRACT OF THE DISCLOSURE

An extruder includes a cylindrical feed head having an internal feed cavity which is connected at the top of the head to a hopper for the plastic material to be extruded. A plurality of cylinders separately connected into an end face of said cylindrical feed head and have inlets inside the cavity for receiving the material to be plasticized. An extruder screw is arranged at each cylinder and connected to drive means for selective rotation of each screw. All of the cylinders are connected at their outer end to a combining head for combining the material discharged from each of the cylinders into a single outlet.

---

This invention relates, in general, to the construction of extrusion machines and, in particular, to a new and useful machine for the continuous extrusion of plastics material which includes a plurality of separately acting extrusion screws capable of being driven separately or collectively and at varying speed for varying the output of the extruded material.

The present invention is an improvement of the extrusion machines of the prior art particularly in respect to the means for providing great variations of capacity or output of extruded products. With prior art machines, it is not possible to achieve a great range of variation of the output of extruded material over a given time. Efforts have been made to counteract this difficulty by replacing a single machine by many smaller units, but the power consumption and the greater space required and other disadvantageous factors have made such solutions unsatisfactory.

In accordance with the present invention, there is provided an extruder which includes a plurality of extruder screws arranged in separate conduit elements or cylinders which are advantageously connected at one end to a common supply for the extruded material and connected to converge at the opposite end for delivering the extruded material through one or a plurality of separate discharge openings. In the preferred arrangement, each of the screws may be selectively connected to driving means or permitted to idle and the speed of operation of the screws may be varied over a wide speed range. In such a manner, the extruder provides a device for readily varying the output and a device which can meet the different requirements of the work cycles without any substantial disadvantages from the point of view of installation and running costs.

The device advantageously includes a combining head which may be connected to the separate outlets of the individual feeder screw cylinders in order to gather into one duct the material extruded by all of the screws. With such an arrangement, it is possible, for example, to obtain a multicolored product when the raw materials are fed separately into the different extrusion screw cylinders, with a different color being fed to each respective cylinder.

Accordingly, it is an object of this invention to provide an extruder having a plurality of extruder cylinders with separate extruder screws therein which are advantageously separately driven or driven through a drive in which one or more of the screws may be disconnected.

A further object of the invention is to provide an extruder screw device which includes a plurality of screw cylinders which are advantageously connected to either a common feeder hopper or to individual feeder hoppers and in which the discharge of the screws may be oriented for separate discharge or directed into a collecting duct for a combined discharge.

A further object of the invention is to provide an extruder device which includes a plurality of extruder cylinders with an extruder screw in each cylinder for extruding the material therethrough from either a common hopper supply or a plurality of hopper supplies and wherein there is provided means for separately varying the speed of rotation of each screw from zero, or no speed, up to a maximum speed.

A further object of the invention is to provide an extruder device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a perspective view partly in section of an extruder constructed in accordance with the invention;

FIG. 2 is a section taken along the line 2—2 of FIG. 1, but indicated on a reduced scale;

FIG. 3 is a perspective axial section through a combining head which may be employed with the extruder indicated in FIG. 1;

FIG. 6 is a schematic plan view partly in section of another embodiment of the extruder; and FIG. 7 is a view similar to FIG. 6 of still another embodiment of the extruder.

Figure 4:
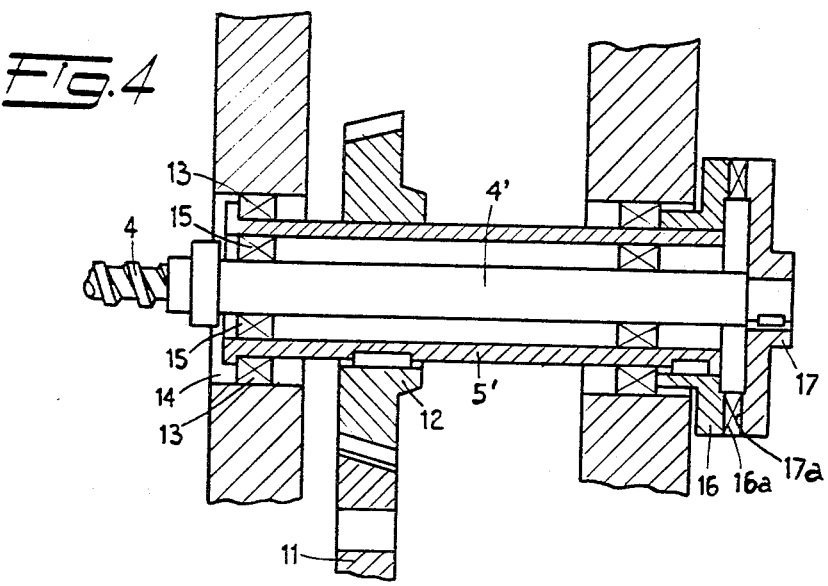
FIG. 4 is a partial axial section of the driving end of a screw conveyor indicating a direct driving arrangement.

Referring to the drawings, in particular, the invention embodied therein as indicated in FIGS. 1 and 2 comprises a variable output extruder including a housing 1 which contains the driving means (to be described hereinafter) for a plurality of extruder screws 4 which are arranged in respective cylinder portions 5 for feeding the extruded material therealong. A hopper 2 is provided for charging the plastic material to be extruded into the apparatus and it is connected at its lower end to a cylindrical feed head or feeder device 3 which defines the inlet end of the individual cylinder 5.

As indicated in FIG. 2, the feeder device 3 includes a cavity 3a into which the material from the hopper 2 is directed and in which there is located the inlet ends of each of the cylinders 5 which will be filled with material by rotation of the screws 4. A deflector 3b is provided to give a better distribution of the material within the cavity 3a.

In the embodiment of FIGS. 1 and 2, the extruder screws 4 and their respective cylinders 5 operate separately but they all converge into a common outlet head 6. A combining head, indicated in dotted lines in FIG. 1, may be mounted at the end of the combining head by means of a flange and connecting bolt (not shown).

The combining head 7, as indicated in FIG. 3, has as many ducts 8 as there are working cylinders 5. The ducts 8 are separated at the inlet end of the combining head 7 by means of a generally conical body 9 so that they converge toward a common outlet port 10. With the combining head 7 in place, the product is eventually extruded through the port 10 instead of the four separate outlet ports in the head 6 which are provided by each of the tubes 5.

By using a combining head 7, it is possible to produce multi-colored extrusions. If this is desired then the hopper 2 is provided with dividing partitions which connect to feed directly into the inlet end of the respective cylinders 5. In this manner, a different color may be fed through each connecting channel.

A feature of the invention is that the individual screws 4 may be driven either separately or collectively from a driving motor (not shown). Thus, if an extruded product is required from two screws only, it is sufficient to connect the motor to drive the two selected screws only and to apply a combining head having only two ducts 8 in positions to register with the outlets of the head 6 of the two selected screws 4 and cylinders 5.

Figure 5:
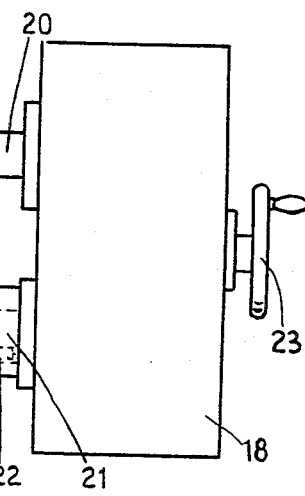
FIG. 5 is a view similar to FIG. 4 of another embodiment of the invention.

A single driving motor may be used or a plurality of driving motors, if so desired. When a single driving motor is used, the individual screws are connected by friction clutches of the mechanical or electro-magnetic type. In FIGS. 4 and 5, there is indicated alternate connecting means in the form of a gear-type coupling device particularly arranged for use in a machine in FIGS. 1 and 2 and which provide respectively for direct and indirect drive of the different screws.

The connecting means of FIG. 4 provides for a direct drive. A driving gear 11 which is driven from a motor (not shown) is arranged centrally between the barrels 5 in a position to drive individual gear wheels 12 which are affixed to a supporting sleeve or cylindrical extension 5'. The extension 5' is journalled for free rotation in bearings 13 mounted in an aperture 14 in the wall of the housing 1, which communicates with the feeder device 3. The extruder screw 4 is mounted on bearings 15 within the sleeve 5'.

A direct coupling between the sleeve 5' and the screw 4 is obtained through two gears 16 and 17 having, respectively, frontal opposed teeth 16a and 17a. The gear 16 is secured to the sleeve 5' and rotates therewith and the gear 17 is secured to the screw 4 so that when the gears are in meshing engagement, the screw 4 is driven by the gear 11. The gear 17 is arranged to be axially movable on a spline connection to its associated screw 4 between positions in which it is coupled in engagement and a position in which it is free of such engagement with the gear 16. When the gears 16 and 17 are coupled, the associated screw 4 will be driven by the motor within the housing 1. In the preferred arrangement, the central gear is arranged to connect all of the gears 12 of each of the associated sleeves 5 for the respective screws 4 so that any one of these screws 4 may be disconnected from the drive by simply disengaging the gears 16 and 17. The gear ratio between the engaging gears of the drive may advantageously be the same for each screw 4 so that all of the screws may rotate at the same speed. With the device, as indicated in FIG. 4, therefore, the screws 4 may be driven at the same speed or individual ones of the screws may be disconnected from the drive.

When the working requirements, such as output, thrust, extrusion speed, and the like call for the screws to be rotating the individual screws 4 of the device to be rotating at different speeds, it is possible to modify the connecting means for driving the screws as indicated in FIG. 5. In this embodiment a speed changer 18 provides a connection between the central driving gear 11 and the screw 4. The speed changer 18 is inserted between the screw 4 and the gear 16 which is secured to the sleeve 5' so that the free running conditions of the sleeve 5' and of the screw 4 are preserved.

The speed changer 18 has a gear 19 which is keyed to the shaft 20 and coupled to the gear wheel 16 which is secured to the sleeve 5. The speed changer 18 also has an output shaft 21 which is selectively connected to the screw 4' through a toothed coupling 22. By operation of a control device 23 for the speed changer 18, the ratio of the rotational speeds of the input and output shafts 20 and 21 can be modified to modify the speed or rotation of the screws 4 while the driving motor speed for the gear 11 remains constant. The range of variation offered by the speed changer 18 is, of course, selected to suit the various applications of the machine as designed. It will be evident that by using a suitable speed changer for each screw 4, the required range of speed is obtained for each of them.

In the embodiment illustrated in FIG. 6, there is provided an extruder which includes separate cylinders 5" and extruders 4" rotating within each of the cylinders 5". Each of the extruder screws 4" are driven by a separate electric motor 24 through a coupling 24a and a speed changer 25. Couplings 24a can be of any suitable type, for example, a disk-type coupling. The speed changer 25 can also be of any suitable type. The output shaft of each speed changer is connected to drive a respective one of the screws 4, all of which converge to a common outlet head 6". In the embodiment of FIG. 7, four separate cylinders each referred to as 5''' include separate extruder screws referred to as 4'''. The cylinders are arranged to converge into a single collecting head 6'''. In this device, the screws 4''' are operated separately from individual motors 26 which are connected to drive respective hydraulic pumps 27. The pumps 27 each have an inlet through which they draw a suitable hydraulic medium from a common reservoir or tank 28. The medium is then fed from the pump outlet through a pipe 29 to a respective hydraulic motor 30 which drives a respective one of the extrusion screws 4. With the arrangement of FIG. 7, no speed changers are required since the rotational speed can be controlled by varying the pressure of the hydraulic medium supplied to each motor 30. The motors 30 may be of a type other than hydraulic or electric and may, for example, be a pneumatic motor.

The use of a separate motor for each extrusion screw permits the extruders to operate with all of the advantages of the other embodiments and to operate so that proportional flow control of materials through the individual cylinders 5''' may be effected, for example, when feeding different types of materials.

While specific embodiments of the invention have been shown and described in detail to illustrate the application of the inventive principles, it will be understood that the invention may be embodied otherwise without departing from such principles.

What is claimed is:

1. A feeder head having a feed cavity, feed hopper means connected to said head for feeding a plastic material to be extruded into said feed cavity, a plurality of elongated cylinders having their inner ends connected to said head at widely spaced locations and having inlets adjacent their inner ends in communication with said cavity, said cylinders having opposite outer ends diverging inwardly toward each other and having outlets adjacent the opposite ends arranged to discharge the plastic material therefrom, a combining head connected to the outlets of all of said cylinders and having internal conveying passages leading to a single passage for combining the material flow discharged from each of said cylinders into a single outlet, and driving means connected to said extruder screws for rotating said screws for advancing material being extruded through said cylinders.

2. An extruder according to claim 1, wherein said feed head includes a single cavity communicating with all of said cylinder inlets.

3. An extruder according to claim 1, wherein said extruder feed head is substantially cylindrical and has a flat end face on one side, said cylinders being connected into said flat end face.

References Cited
UNITED STATES PATENTS

| | | | |
|---|---|---|---|
| 1,546,155 | 7/1925 | Wadsworth | 18—12 |
| 1,933,528 | 10/1933 | Wallace et al. | |
| 2,466,934 | 4/1949 | Dellenbarger | 18—12 |
| 2,807,833 | 10/1957 | Schanz | 18—13 |
| 2,942,294 | 6/1960 | Reifenhauser | 18—12 |
| 3,068,521 | 12/1962 | Gasper et al. | 18—30 |
| 3,121,255 | 2/1964 | Henning et al. | 18—13 |
| 3,213,808 | 10/1965 | Schafer | 18—13 |
| 3,325,864 | 6/1967 | Kohyama et al. | 18—12 |

WILLIAM J. STEPHENSON, *Primary Examiner.*